P. BECHE.
Tide-Power.
No. 163,965.  Patented June 1, 1875.
FIG I
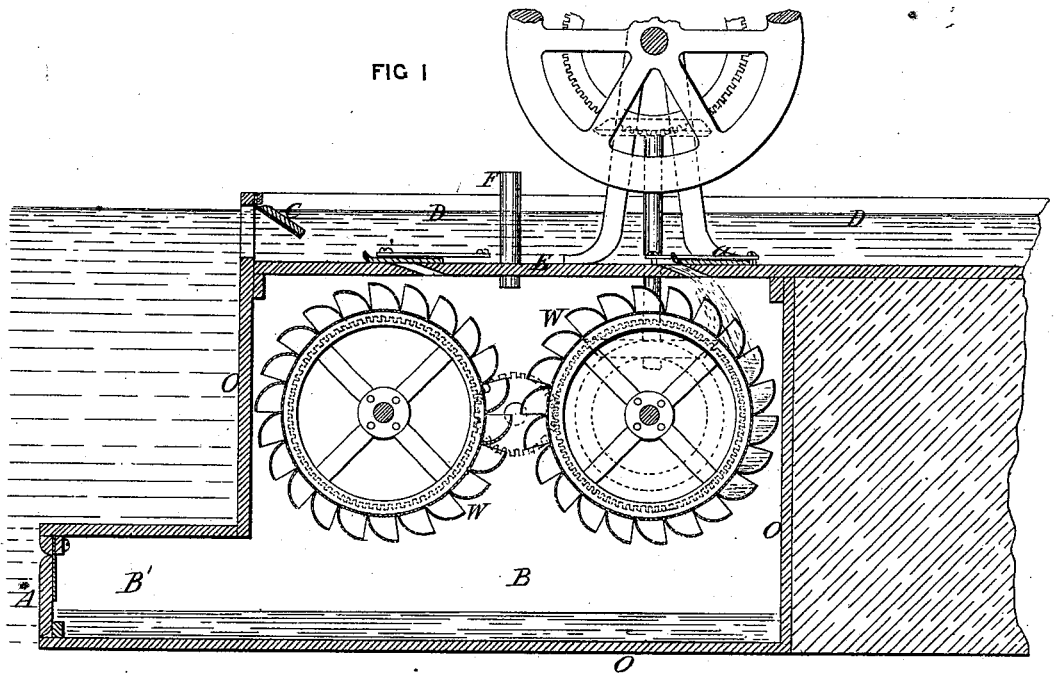
FIG II
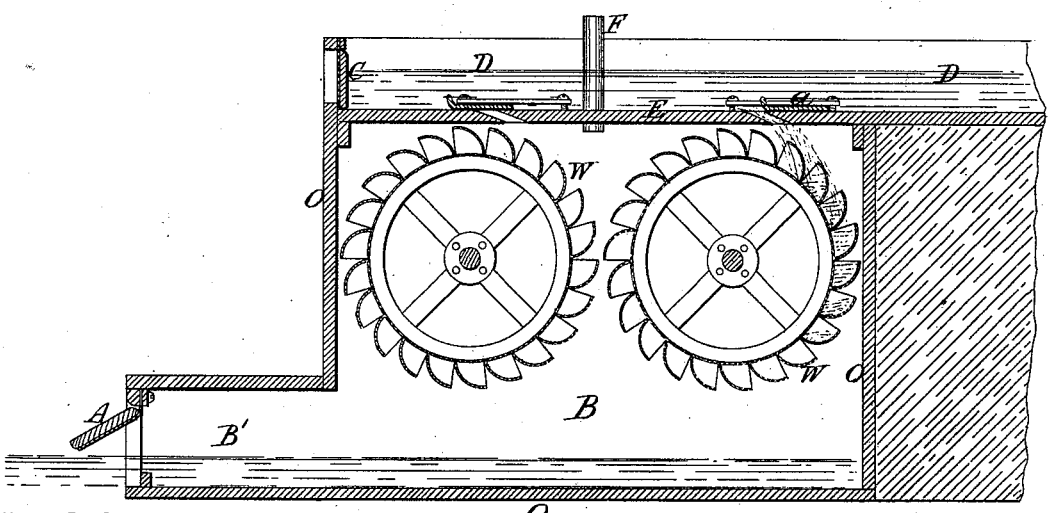
WITNESSES  
John E. Laing  
J. A. Rutherford
INVENTOR  
Peter Beche  
by Johnson and Johnson  
his Attys

UNITED STATES PATENT OFFICE.

PETER BECHE, OF BATH, PENNSYLVANIA.

IMPROVEMENT IN TIDE-POWERS.

Specification forming part of Letters Patent No. 163,965, dated June 1, 1875; application filed March 19, 1875.

*To all whom it may concern:*

Be it known that I, PETER BECHE, of Bath, in the county of Northampton and State of Pennsylvania, have invented a certain new and useful Method of Utilizing Tides as a Power; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention is designed to utilize tides as a power for driving machinery; and for this purpose I construct a suitable inclosure for one or more water-wheels, and to form a dam above and below said wheel, and I combine with this inclosure suitable gates, one with the lower dam and the other with the upper dam, in such a manner that these gates shall be opened and closed alternately by the ebb and flow of the tide. The flow of the tide closes the lower dam-gate to prevent the water from filling said dam, and when the tide has risen to its height it opens the upper dam-gate to let in the tide upon the wheels and to fill the dam. The ebb of the tide closes the upper dam-gate, and the water from the dam-head operates the wheel, and discharges into the lower dam until the ebb has reached the lower gate, when it automatically opens and lets the water pass out with the ebb-tide. The upper dam is provided with suitable gates to regulate the water to the wheels, and to cut it off when desired. In this way I control the tide to apply the power of water to drive wheels of any construction to produce power for driving machinery for any desired purpose, the gist of my invention being the employment of suitable automatic gates, the operation of which shall be controlled by the tide, and thereby establish a water-power by storing up water from the flood-tide, and utilizing the power of such head to continue the operation of the wheels during the ebb of the tide and until the flood-tide. The trunk-dam has provision for permitting the escape of air therefrom while filling with water.

In the accompanying drawings, Figure 1 represents a vertical section of an apparatus showing the application of my tide-power invention at flood-tide, and Fig. 2 a similar view, showing the tide-gates at ebb.

In carrying out my plan of controlling the tides as a power, I construct a suitable inclosure, O, on a foundation wherever I can obtain the advantage of the tides, and arrange therein a water-wheel, W, or wheels, of any desired construction, either upon horizontal or vertical shafts. When two are used they may be connected for joint operation to obtain greater power, or they may be disconnected and one only used by suitable means. A flooring, E, separates the wheel-compartment from the upper dam D, and forms the forebay. The upper dam must be sufficiently below high tide to leave head-water enough to drive the machinery during the ebb, and the lower dam B must be of sufficient capacity to receive the water used from the upper dam until the ebb opens the lower gate to let it out, and for this purpose a trunk, B', is built as a continuation of the lower dam B on a level with low water. In the side of the casing fronting the incoming tide I arrange two gates, the one A at the end of the trunk B' of the lower dam B opening outward, and one, C, in the side of the upper dam D opening inward. These are called flow and ebb gates, and are opened and closed by the tides. The lower gate is closed by the flow of the tide, and the upper one is opened by the ebb of the tide. They may be hinged in any suitable manner to accomplish this object.

As the tide rises, it closes the lower gate, and, reaching the upper one, opens it and allows the water to flow into the upper dam, and passing through the gates *a* in the flooring E upon the wheel, turns it, and drives the machinery, and at the same time collects a head in the dam D for subsequent use. As the tide ebbs, the upper gate closes, and confines the water in this dam to continue the operation of the wheels until the next tide. During the ebb-tide the water from the upper dam collects in the lower dam, the gate of which is kept closed by the outside pressure of the water, and when the ebb has reached the lower gate it opens and lets out the water from the lower dam with the ebb. In this way the operation of the water-wheels is made continuous by the flood and ebb of the tides, as the gates operate to control the tides in the collection of the necessary water for the power.

The lower dam should be water-tight, and is provided with suitable air-vents F to let out the air while being filled from the upper dam. Suitable gearing from the water-wheels connect with the driving-power shaft above; but these form no part of my invention, and may be arranged in any suitable way for the purpose. The slide-gates $a$ for the water-wheels may be opened and closed, and regulated in any suitable way.

I claim—

1. The method, substantially herein described, of utilizing the tides as a power by means of a flood and ebb gate, C A, communicating with an upper water-head dam, D, and a lower receiving and emptying dam, B, and a water-wheel, W, or wheels between these dams for joint operation, as herein set forth.

2. The combination, in a tide-power apparatus, of an ebb-gate, A, opening outward, and a flood-gate, C, opening inward, with the lower and upper dam D B, and the water wheel or wheels, combined for operation with these tide-gates, substantially as herein set forth.

In testimony that I claim the foregoing I have affixed my signature in presence of two witnesses.

PETER BECHE.

Witnesses:
 A. E. H. JOHNSON,
 J. W. HAMILTON JOHNSON.